United States Patent [19]

Barnhart

[11] Patent Number: 5,671,943
[45] Date of Patent: Sep. 30, 1997

[54] COVER FOR TEMPORARILY PROTECTING AUTOMOTIVE AIR BAG MODULE

[75] Inventor: Robert J. Barnhart, East Detroit, Mich.

[73] Assignee: Chrysler Corporation, Auburn Hills, Mich.

[21] Appl. No.: 614,608

[22] Filed: Feb. 6, 1996

[51] Int. Cl.⁶ ............................................. B60R 21/16
[52] U.S. Cl. ............................ 280/728.3; 280/732
[58] Field of Search ....................... 280/728.1, 728.3, 280/731, 732

[56] References Cited

U.S. PATENT DOCUMENTS 5,431,436  7/1995  Mossi et al. ........................ 280/732
5,474,325  12/1995  Daines et al. ...................... 280/732
5,542,699  8/1996  Verdick ............................. 280/732

*Primary Examiner*—Kenneth R. Rice
*Attorney, Agent, or Firm*—Edward A. Craig

[57] ABSTRACT

A removable cover for temporarily protecting a lid on a passenger air bag module installed in an instrument panel of an automotive vehicle, during assembly of a trim panel on the instrument panel. The cover is shaped to fit over and protect the lid. The cover is fabricated of a rubber-like material and has mounting tabs adapted or releasably engage in slots in the air bag module. Magnets on the cover magnetically engage the air bag module. Projections on the air bag module engage in recesses in the cover to assist in locating the cover.

2 Claims, 3 Drawing Sheets

COVER FOR TEMPORARILY PROTECTING AUTOMOTIVE AIR BAG MODULE

FIELD OF INVENTION

This invention relates generally to a cover for protecting a passenger air bag module installed in an instrument panel of an automotive vehicle, during assembly of a trim panel on the instrument panel.

BACKGROUND AND SUMMARY OF THE INVENTION

Typically, a trim panel is applied over the instrument panel. The trim panel is formed with an opening clearing the lid on the passenger air bag module so that the air bag can deploy through the opening. However, the trim panel sometimes has sharp edge and burrs, which during assembly of the trim panel on the instrument panel, can scratch or mar the lid. What is needed is some means of temporarily protecting the lid of the air bag module during assembly of the trim panel.

In accordance with the present invention, a cover is provided for temporarily capping and protecting the lid of the air bag module.

Preferably, the cover is provided with mounting tabs adapted to extend into slots in the air bag module. In addition, the cover is preferably provided with locating recesses adapted to receive complementary projections on the air bag module to ensure that the cover is properly located. The cover may also have a marginal flange to engage and protect the edge of the lid and further ensure proper location. As an additional means of temporarily attaching the cover, the cover is also preferably provided with a magnet or magnets engageable with the air bag module.

The cover can be easily removed through the opening in the trim panel and used over and over again.

One object of this invention is to provide a means for protecting the lid of a passenger air bag module having the foregoing features and capabilities.

Another object is to provide a cover for protecting the lid of a passenger air bag module which is composed of a relatively few simple parts, is rugged and durable in use and can be re-used many times, and is capable of being inexpensively manufactured and easily installed for the purpose intended.

Other objects, features and advantages of the invention will become more apparent as the following description proceeds, especially when considered with the accompanying drawings.

DETAILED DESCRIPTION OF THE PREFERRED EMBODIMENT

Figure 1:
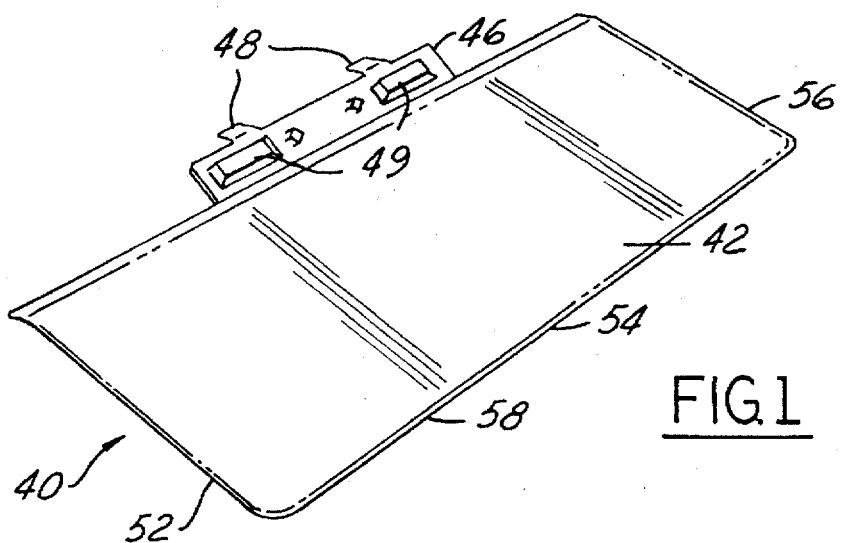
FIG. 1 is a perspective view of a cover for protecting the lid on a passenger air bag module during assembly of a trim panel on the instrument panel, constructed in accordance with the present invention.

Referring now more particularly to the drawings and especially FIGS. 4–9, there is shown an instrument panel assembly 10 including an instrument panel 11 on which is mounted a passenger air bag module 14. A molded trim panel 16 covers the instrument panel.

The air bag module 14 comprises a canister 18 for receiving an air bag. The canister 18 has a door or lid 24 which opens by the force of the air bag when the air bag deploys. The trim panel 16 has a rectangular opening 26 which registers with the lid 24, exposing the lid so that when it opens, the air bag is permitted to deploy.

The trim panel 16 and lid 24 are both preferably made of a suitable resinous plastic material, such for example, as a mixture of acrylonitrile-butadiene-styrene (ABS) and polycarbonate. A decorative layer of vinyl or like material may cover the trim panel and the lid. The lid 24 is rectangular and of the same size and shape as the opening 26 in the trim panel 16. The lid preferably projects into the opening 26 so as to be substantially flush with the trim panel and its cover layer matches that of the trim panel in color and texture. The trim panel 16 is attached to the instrument panel 11 by any suitable means (not shown.)

Figure 5:
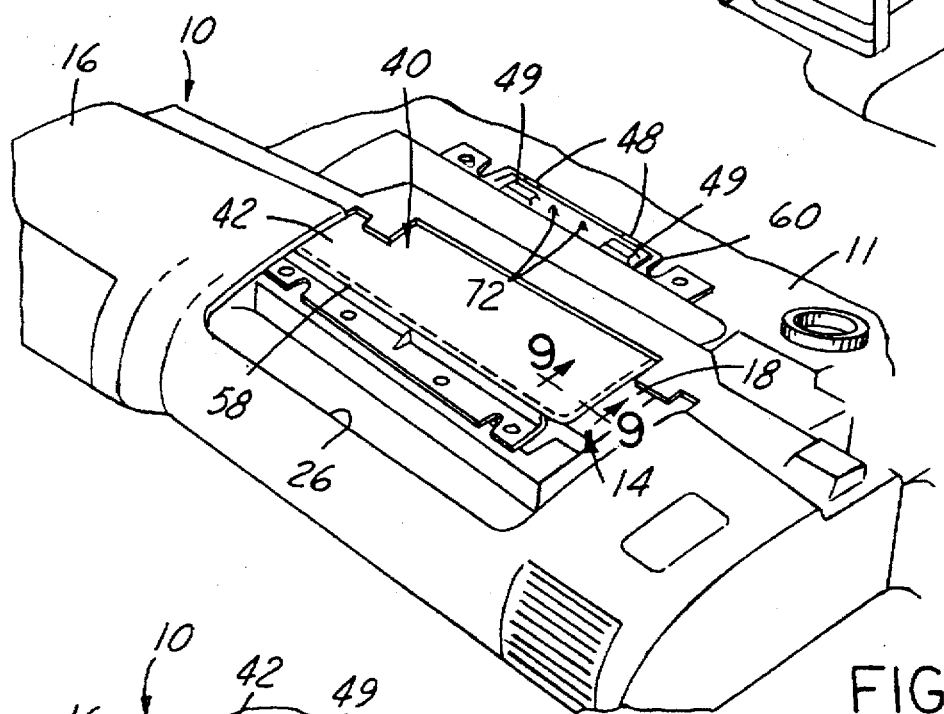
FIG. 5 is a perspective view showing the trim panel in the process of being applied to the instrument panel, with the cover in place on the lid of the air bag module.
Figure 6:
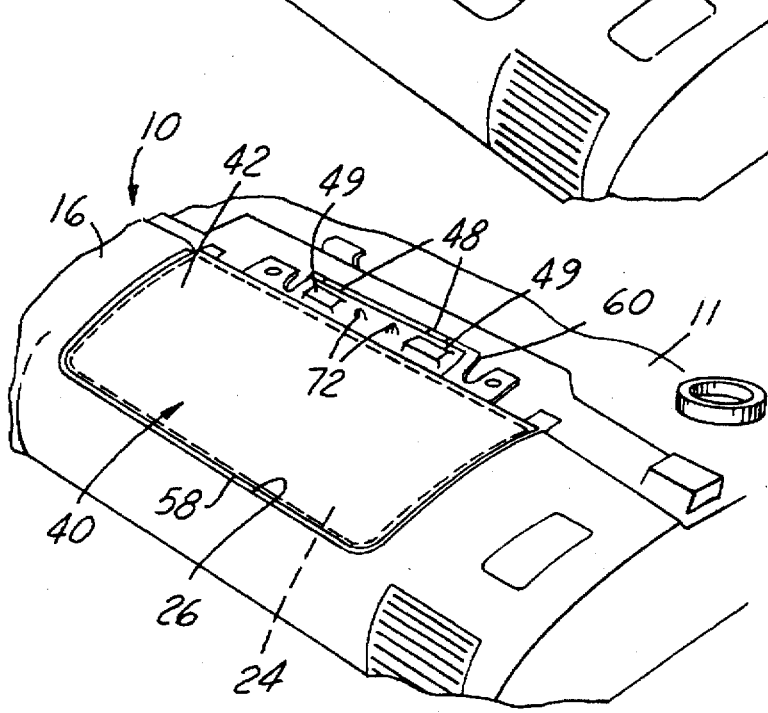
FIG. 6 is a fragmentary perspective view showing the cover in place on the lid of the air bag module and the trim panel in place on the instrument panel.
Figure 7:
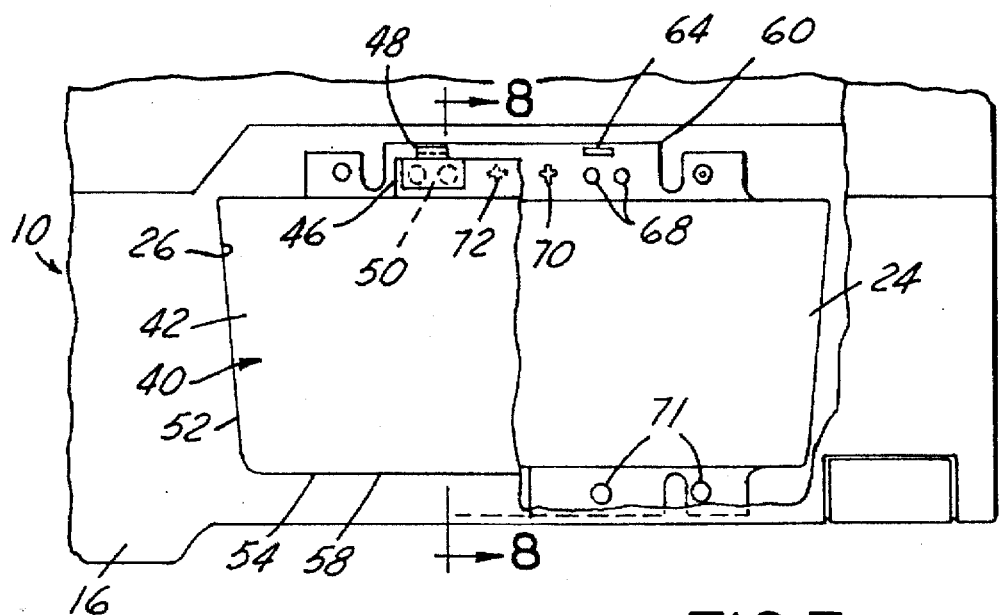
FIG. 7 is a fragmentary elevational view of a portion of the structure in FIG. 6 with parts broken away.
Figure 8:
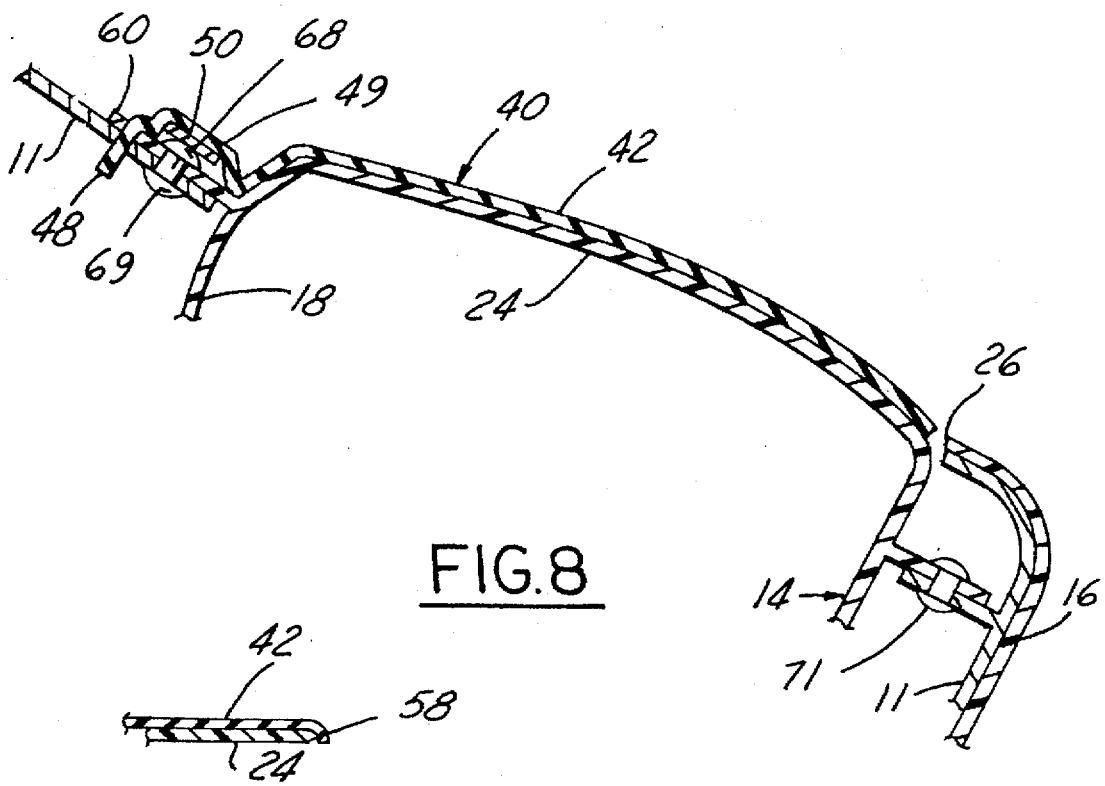
FIG. 8 is a sectional view taken on the line 8—8 in FIG. 7.

One problem in the application of the trim panel 16 on the instrument panel 11 is that the trim panel sometimes has rough edges which will scratch or mar the decorative layer on the lid 24 of the air bag module as the trim panel is maneuvered into position (FIG. 5). This destroys the aesthetic appearance of the lid, which as before noted, is fully exposed through the opening 26 of the trim panel, and is unacceptable. A defaced lid has to be replaced, resulting in additional cost in both time and materials.

Figure 2:
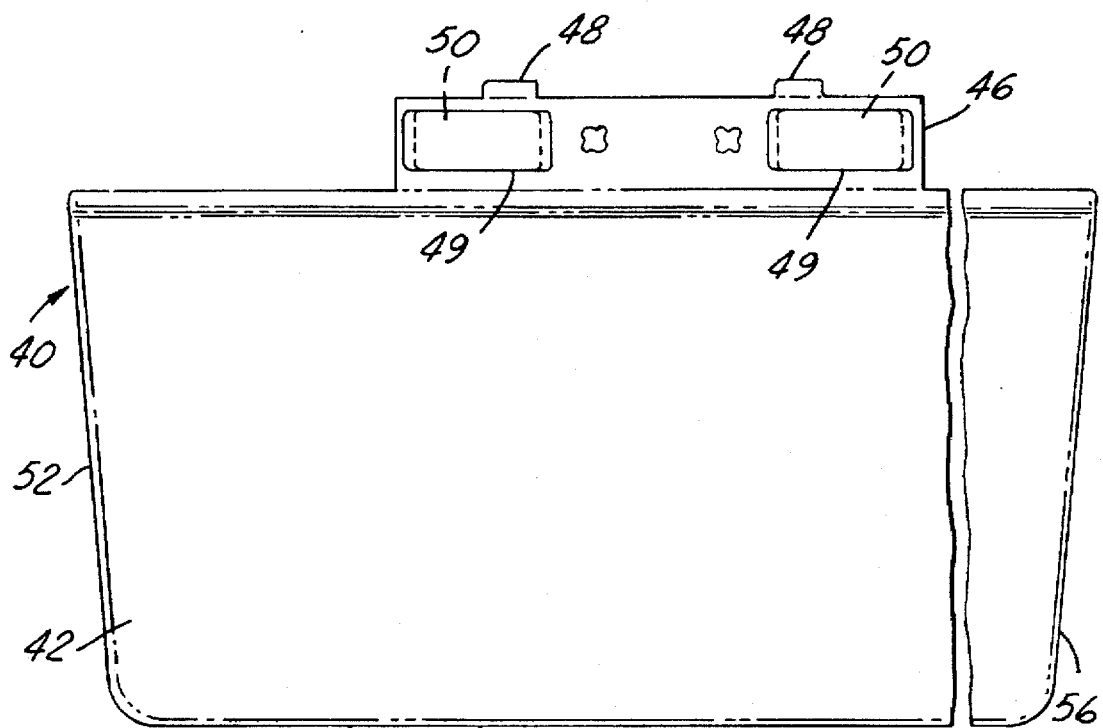
FIG. 2 is a front elevational view of the cover shown in FIG. 1, with parts broken away.
Figure 3:
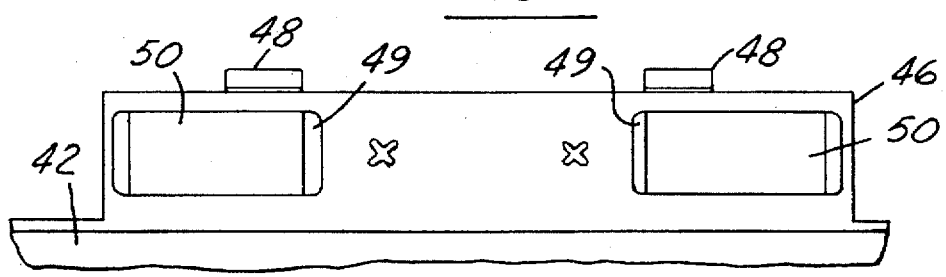
FIG. 3 is an enlarged view of the upper edge portion of the cover as seen from the side opposite the side shown in FIG. 2.
Figure 4:
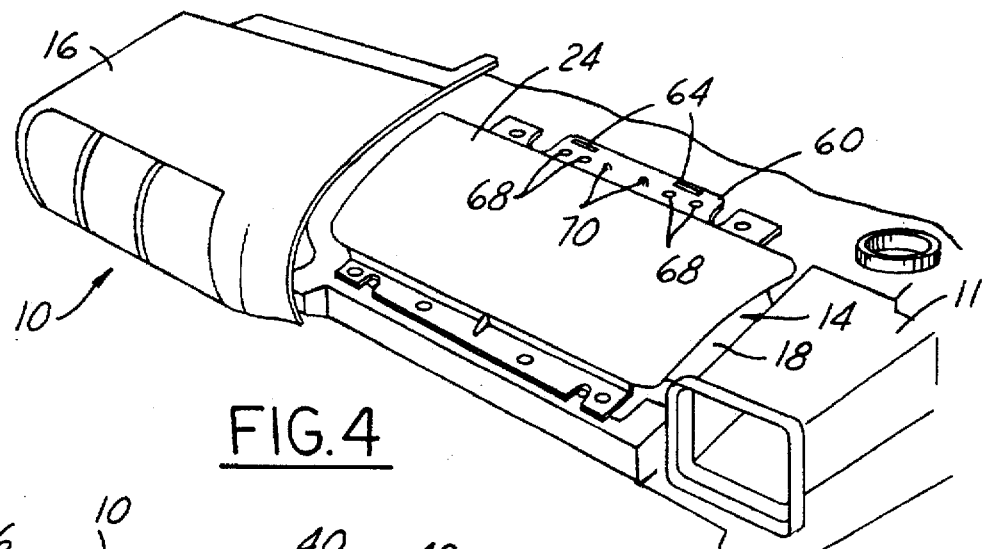
FIG. 4 is a perspective view of an instrument panel assembly showing a trim panel partially covering the instrument panel but broken away to expose the air bag module.

In order to protect the lid of the air bag module, a removable cover 40 (FIGS. 1–3) is provided. This cover is of integral, one piece construction and is shaped to fit over and protect the lid during assembly of the trim panel on the instrument panel.

Figure 9:
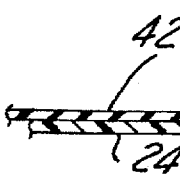
FIG. 9 is a fragmentary sectional view taken on the line 9—9 in FIG. 5.

The cover 40 is preferably made of a flexible rubber-like material which may be a natural or synthetic rubber and has a generally flat rectangular main body portion 42 similar in size and shape to the lid of the air bag module. Along the top of the main body portion 42, the cover has an integral marginal edge portion 46 formed with integral laterally spaced mounting tabs 48. Adjacent to the mounting tabs are two laterally spaced-apart deformations 49 forming recesses on the side of the marginal edge portion 46 facing the lid. A magnet 50 is disposed in each recess. The magnets are secured by any suitable means such as an adhesive. The other three side edges 52,54 and 56 of the main body portion 46 are rolled or curled to provide a continuous flange 58 which is adapted to fit over and protect the corresponding edges of the lid (FIG. 9).

The canister 18 of the air bag module 14 has a strip 60 at the top which is formed with two laterally spaced slots 64 which are adapted to register with and receive the mounting tabs 48 on the cover when the cover is applied over the lid. This strip 60 also has metal surfaces, in this instance provided by the heads 68 of rivets 69 which are adapted to be engaged by the respective magnets 50 when the cover is applied to the lid, and are of a material which is attracted by the magnets so as to magnetically hold the cover on the lid. Rivets 69 and 71 mount the air bag module on the instrument panel 11. The tabs serve both to locate and retain the cover on the lid.

In use, the cover 40 is applied over the lid 24 of the air bag module 14 after the module is mounted on the instrument panel, with the flange 58 extended over the corresponding edges of the lid and with the tabs 48 removably engaged in the slots 64 on the strip 60 of the canister. In this position, the magnets engage the metal rivet heads 68 to magnetically hold the cover on the lid. As an additional locating feature, the strip 60 on the air bag canister has a pair of laterally-spaced apart projections 70 which engage in registering recesses 72 in the edge portion 46 of the cover when the cover is applied to the lid.

With the cover 40 applied properly over the lid 24, the lid, including its edges, is fully covered. Accordingly, when the trim panel 16 is subsequently attached to the instrument panel, the lid is protected from damage. After the trim panel 16 has been secured on the instrument panel 11, the cover 40 may be easily removed through the opening 26 in the trim panel and used over and over again in the assembly of other trim panels and instrument panels.

What is claimed is:

1. In combination, an air bag module having a lid and a removable cover for temporarily protecting the lid after the air bag module is installed in an instrument panel of an automotive vehicle and during the time a trim panel, provided with an opening adapted to expose the lid and through which the cover can be removed, is assembled on the instrument panel, said lid being generally rectangular, said cover having a flexible, generally rectangular main body portion of a size and shape corresponding to said lid and adapted to fit over said lid and being fabricated of a rubber-like material, said air bag module having laterally spaced slots, and said main body portion having a marginal edge portion formed with mounting tabs adapted to releasably engage said slots to removably mount and locate said cover on said lid.

2. A combination as set forth in claim 1, wherein said marginal edge portion of the main body portion of said cover has laterally spaced apart deformations forming recesses on the side of said marginal edge portion facing the lid, and a magnet disposed in each of said recesses magnetically engageable with said air bag module.

* * * * *